United States Patent
Patel et al.

(10) Patent No.: US 8,673,236 B2
(45) Date of Patent: Mar. 18, 2014

(54) WATER SOLUBLE FILM BASED MATRIX TO COLLECT SAMPLES EXTRACTED FROM LIVING SPECIES

(75) Inventors: Shilpan Pravinchandra Patel, Mumbai (IN); Nikita Kamlesh Thanawala, Mumbai (IN)

(73) Assignee: Arrow Coated Products, Ltd., Andheri (West) Mumbai, Maharashtra (IN)

( * ) Notice: Subject to any disclaimer, the term of this patent is extended or adjusted under 35 U.S.C. 154(b) by 164 days.

(21) Appl. No.: 12/302,481

(22) PCT Filed: Apr. 25, 2007

(86) PCT No.: PCT/IN2007/000175
§ 371 (c)(1),
(2), (4) Date: Nov. 25, 2008

(87) PCT Pub. No.: WO2007/138614
PCT Pub. Date: Dec. 6, 2007

(65) Prior Publication Data
US 2009/0197341 A1 Aug. 6, 2009

(30) Foreign Application Priority Data
May 25, 2006 (IN) .......................... 1475/MUM/2005

(51) Int. Cl.
*G01N 1/02* (2006.01)
*A61B 19/00* (2006.01)
*A61F 13/15* (2006.01)

(52) U.S. Cl.
USPC ............................ 422/419; 422/408; 422/430

(58) Field of Classification Search
None
See application file for complete search history.

(56) References Cited

U.S. PATENT DOCUMENTS

| | | | |
|---|---|---|---|
| 5,246,664 A | 9/1993 | Nagata et al. | |
| 5,298,260 A * | 3/1994 | Viegas et al. | 424/486 |
| 5,658,977 A | 8/1997 | Yang et al. | |
| 2008/0038326 A1 * | 2/2008 | Drew et al. | 424/444 |

FOREIGN PATENT DOCUMENTS

| | | |
|---|---|---|
| EP | 0254457 A1 | 1/1988 |
| GB | 2421431 A | 6/2006 |
| WO | 03031637 A1 | 4/2003 |
| WO | 2006067514 A1 | 6/2006 |
| WO | WO 2006067514 A1 * | 6/2006 |
| WO | 2006117804 A2 | 11/2006 |
| WO | 2006120700 A2 | 11/2006 |

OTHER PUBLICATIONS

Kancharla et al. "Fabrication of biodegradable polymeric microdevices using laser micromachining." Biomedical Microdevices (2002) 4 105-109.*

* cited by examiner

*Primary Examiner* — Christopher A Hixson
(74) *Attorney, Agent, or Firm* — Polster Lieder Woodruff & Lucchesi, LC

(57) ABSTRACT

The invention relates to a water soluble film based matrix for collecting blood samples, urine samples, serum samples or any other type of samples extracted from living species; so as to avoid cross infection or spillage of samples during transportation of said samples. These samples can then used for further detection of virus, bacteria, finding new molecules, diagnosing genes or extraction of DNA. Also, said matrix will dissolve during analysis of the sample and thus there will be no disposal problems.

26 Claims, 1 Drawing Sheet

WATER SOLUBLE FILM BASED MATRIX TO COLLECT SAMPLES EXTRACTED FROM LIVING SPECIES

FIELD OF INVENTION

The invention relates to a water soluble film based matrix for collecting blood samples, urine samples, serum samples or any other type of samples extracted from living species; so as to avoid cross infection or spillage of samples during transportation of said samples. These samples can then used for further detection of virus, bacteria, finding new molecules, diagnosing genes or extraction of DNA. Also, said matrix will dissolve during analysis of the sample and thus there will be no disposal problems.

BACKGROUND OF THE INVENTION

Conventional methods include collecting and storing blood samples, urine samples, serum samples, saliva, etc are in glass bottles, plastic bags, or plastic bottles or on glass plates etc and these collected samples are further used for detection of virus, bacteria, finding new molecules, diagnosing genes or extraction of DNA or for any other similar purpose.

However, these conventional methods of collecting blood samples may cause cross infection due to spillage or direct contact with the sample and hence may result in diverse consequences.

Also, the disposal of these containers is a problem and can cause infection if not disposed properly.

Hence, there is a need to provide a novel system for collecting and storing blood samples, urine samples, serum samples or any other type of samples extracted from living species so as to avoid cross infection or spillage of samples. There is also a need to provide a novel container that destroys itself during the process of analysis, thus eliminating any need of disposal of the container itself.

European patent EP 1127804 describes a packaging unit designed to absorb liquid that is being transported or was spilled or was released. The packaging unit has at least one sealing multilayer comprising a first water soluble film and at least one layer of a water insoluble material, and a corrugated absorbent/adsorbent material between the first permeable material and the water insoluble material that absorbs and immobilizes the liquid material.

The above patent relates to a package to control any additional spillage from the container containing liquid packed inside it. It does not show collecting of a sample extracted from living species into a water soluble film based matrix which is in the form of a strip which can be further dissolved an appropriate solution for further analysis of the extracted sample.

Also, the package as described is EP 1127804 has to be disposed off after the usage and may cause cross contamination. While the matrix of the present invention will be dissolved during analysis of the extracted samples in the lab and hence, the disposal problem is totally eliminated.

Further, the present invention will eliminate the need of glass bottles or any other sort of containers for collecting liquid samples.

In this process, the disposal has not been addressed as it contains a non soluble layer.

OBJECTIVES OF INVENTION

Hence, the main objective of the present invention is to provide a water soluble film based matrix for collecting and storing samples extracted from living species for avoiding cross infection or spillage of samples.

Another objective of the present invention is eliminating the problem of disposal of used containers.

Yet another object of the invention is to allow possibility of mass collection of samples for further detection.

STATEMENT OF INVENTION

According to one aspect, the invention provides a water soluble film matrix, comprising:
  a. a first layer of a perforated hot/warm water soluble film;
  b. a second layer that is the core layer comprising a water soluble or water dispersible absorbent material; and
  c. a third layer of a hot/warm water soluble film.

Said hot water soluble film dissolves in water having temperature above 60° C.

Said warm water soluble film dissolves in water having temperature ranging from 39° C. to 60° C.

Said core layer is formed of materials selected from a group comprising of a water soluble or dispersible super absorbents, a sheet of a cellulosic material, absorbent fibres or any other type of absorbent materials which are soluble or dispersible in water.

According to another aspect, the invention provides a water soluble film matrix, wherein pre-determined quantity of reactive reagents are incorporated into the core layer itself to provide instantaneous result or to provide results by merely dissolving the matrix containing reactive reagents in water without any other addition of reagents.

Said reactive reagents are selected from ethanol, magnesium chloride, copper sulphate, sodium bicarbonate, sodium carbonate, potassium oxalate, sodium tungstate, sulhhuric acid, diacetyl monoxime, fehling solution, benedicts qualitative reagents various buffers and primers generally used for the reactions and the like According to yet another aspect, the invention provides a water soluble film matrix, comprising:
  a. a first layer of a perforated hot/warm water soluble film; and
  b. a second layer that is the core layer, comprising absorbents entrapped in between a cold water soluble film and a hot/warm water soluble film, the hot/warm water soluble film forming a protective layer in this case.

Said cold water soluble film dissolves in water having temperature ranging from 5° C. to 39° C.

According to yet another aspect, the invention provides a method for forming a water soluble film matrix, wherein the perforated hot/warm water soluble film, the core layer and the hot/warm water soluble film are laminated together using a water soluble adhesive or by hot lamination process.

According to yet another aspect, the invention provides a method for forming a water soluble film matrix, wherein the perforated hot/warm water soluble film and the core layer formed by entrapping the water soluble absorbents and/or fibres in between a cold water soluble film and a hot/warm water soluble film; are laminated together using a water soluble adhesive or by hot lamination process; eliminating the need for a third layer of hot/warm water soluble film.

According to yet another aspect, the invention provides a method to use a water soluble film matrix, comprising the steps of dropping a predetermined quantity of the extracted sample on the first layer of perforated hot/warm water soluble film, storing of the matrix containing extracted sample in a zip-lock bag, transporting it to a pre-destined place, dissolving the matrix in water having pre-determined temperature and conducting further tests for analyzing the sample.

According to yet another aspect, the invention provides a method to use a water soluble film matrix, comprising the steps of dropping a predetermined quantity of the extracted sample on the first layer of perforated hot/warm water soluble film, inserting the matrix containing absorbed material into a reader for getting instantaneous results, dissolving the used matrix in water having pre-determined temperature and draining it in the sewage.

DETAILED DESCRIPTION

As per one of the embodiments, the invention provides a water soluble film based matrix for collecting and storing blood samples, urine samples, serum samples or any other type of samples extracted from living species; so as to avoid cross infection or spillage of samples during transportation of said samples.

These samples are then used for further detection of virus, bacteria, finding new molecules, diagnosing genes or extraction of DNA or for any other similar purpose. Also, said matrix will dissolve during analysis of the sample and thus there will be no disposal problems.

Figure 1:
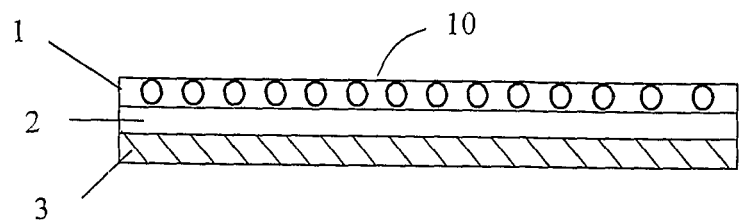
FIG. 1 shows a diagram illustrating a water soluble film based matrix according to an embodiment of this invention.

As shown in FIG. 1, the said water soluble film matrix (10) comprises:
  a. a first layer of a perforated hot/warm water soluble film (1);
  b. a second layer that is the core layer comprising a water soluble or dispersible absorbent material (2); and
  c. a third layer of a hot/warm water soluble film (3).

Said perforated hot/warm water soluble film will help the extracted sample to seep inside the matrix so that it is absorbed by the second layer that is the core layer of water soluble or water dispersible absorbent material. A third layer of hot/warm water soluble film is applied on the absorbent layer side of the matrix so as to further avoid the leakage of the extracted sample from the second layer.

Said hot/warm water soluble film is formed of edible raw materials selected from polyethylene glycol, glycerin, propylene glycol, polyvinylpyrrolidone, proteinaceous binders such as gelatin, modified gelatins such as phthaloyl gelatin, sodium alginate, polysaccharides such as starch, gum Arabic, pullulan and dextrin, tragacanth gum, guar gum, acacia gum, polyacrylic acid, methylmethacrylate copolymer, carboxyvinyl polymer, amylose, sweeteners, pectin, chitin, chitosan, levan, elsinan, collagen, zein, gluten, soy protein isolate, casein, shallac and water-soluble cellulose derivatives or combination thereof. The cellulose derivatives used are methyl cellulose, hydroxy propyl cellulose, hydroxy propyl methyl cellulose, hydroxy propyl ethyl cellulose, hydroxy ethyl cellulose, carboxy methyl cellulose. However, these raw materials are by no means limiting.

Alternatively, said hot/warm water soluble film is formed of non edible raw materials selected from poly vinyl alcohol copolymer ionomers, Polyvinyl alcohol homopolymer, non-ionomeric poly vinyl alcohol polymer, Polymethacrylate, polyvinyl alcohol, polyacrylamide, polymethacrylamide, polyacrylic acid, polymethacrylic acid, polyurethane. However, these raw materials are by no means limiting.

A combination of edible and non edible materials can also be used for forming the hot/warm water soluble film.

Preferably, the hot water soluble film is formed of fully hydrolyzed polyvinyl alcohol wherein the degree of hydrolysis of polyvinyl alcohol ranges from 91% to 99.9%.

Said hot water soluble film dissolves in water having temperature above 60° C.

Preferably, the warm water soluble film is formed by using a combination of fully hydrolyzed and partially hydrolyzed polyvinyl alcohols.

Said warm water soluble film dissolves in water having temperature ranging from 39° C. to 60° C.

The thickness of the hot/warm water soluble film ranges from 5 microns to 100 microns, preferably from 15 microns to 75 microns, more preferably from 25 microns to 50 microns.

The hot/warm water soluble film can be produced by a solution cast method or by an extrusion method. Solution cast films are cast from a slot, which controls thickness and weight, onto a steel belt or steel drum or a suitable liner etc. Extruded films can be blown (bubble type) or slit-die cast (Extrusion curtain type).

Said hot/warm water soluble film mentioned in the invention may be edible or non edible.

Said first layer of hot/warm water soluble film is perforated by any known method like die cutting or laser cutting or mechanical perforation.

The said core matrix layer comprises materials selected from a group comprising of a water soluble or dispersible super absorbents, a sheet of a cellulosic material, absorbent fibres or any other type of absorbent materials which are soluble or dispersible in water.

The water soluble absorbents and/or fibres can be incorporated into a water soluble film to form the core matrix layer. The water soluble or dispersible absorbent material is mixed along with the known water soluble film formulation and the said formulation along with the absorbent material is cast on a liner or a conveyor to form the core layer of said matrix.

The core layer of the said matrix can also be formed by spraying of the absorbent material on a semi dried water soluble film.

The first layer of perforated hot/warm water soluble film, the second layer that is the core layer of absorbent material as formed by mixing of absorbent material in the water soluble film batch formulation or by spraying of the absorbent material on a semi dried water soluble film; and the third layer of hot/warm water soluble film can be laminated together by using either a water soluble adhesive or by heat lamination process.

As per another embodiment, the core layer of the said matrix can also be formed by entrapping of the water soluble or dispersible absorbent material/fibres in between two water soluble films.

The said water soluble films used for entrapping said absorbents can be cold water soluble films or a combination of cold water soluble film and warm water soluble film; or a combination of cold water soluble film and hot water soluble film The said cold water soluble film dissolves in water having temperature ranging from 5° C. to 39° C.

Said cold water soluble film is formed of edible raw materials selected from polyethylene glycol, glycerin, propylene glycol, polyvinylpyrrolidone, proteinaceous binders such as gelatin, modified gelatins such as phthaloyl gelatin, sodium alginate, polysaccharides such as starch, gum Arabic, pullulan and dextrin, tragacanth gum, guar gum, acacia gum, polyacrylic acid, methylmethacrylate copolymer, carboxyvinyl polymer, amylose, sweeteners, pectin, chitin, chitosan, levan, elsinan, collagen, zein, gluten, soy protein isolate, casein, shallac and water-soluble cellulose derivatives or combination thereof. The cellulose derivatives used are methyl cellulose, hydroxy propyl cellulose, hydroxy propyl methyl cellulose, hydroxy propyl ethyl cellulose, hydroxy ethyl cellulose, carboxy methyl cellulose. However, these raw materials are by no means limiting.

Alternatively, said cold water soluble film is formed of non edible raw materials selected from poly vinyl alcohol copolymer ionomers, Polyvinyl alcohol homopolymer, non-ionomeric poly vinyl alcohol polymer, Polymethacrylate, polyvinyl alcohol, polyacrylamide, polymethacrylamide, polyacrylic acid, polymethacrylic acid, polyurethane. However, these raw materials are by no means limiting.

A combination of edible and non edible materials can also be used for forming the cold water soluble film.

The first layer of perforated hot/warm water soluble film, the second layer that is the core layer of absorbent material as formed by entrapping said absorbents in between two water soluble films; and the third layer of hot/warm water soluble film can be laminated together by using either a water soluble adhesive or by heat lamination process.

Figure 2:
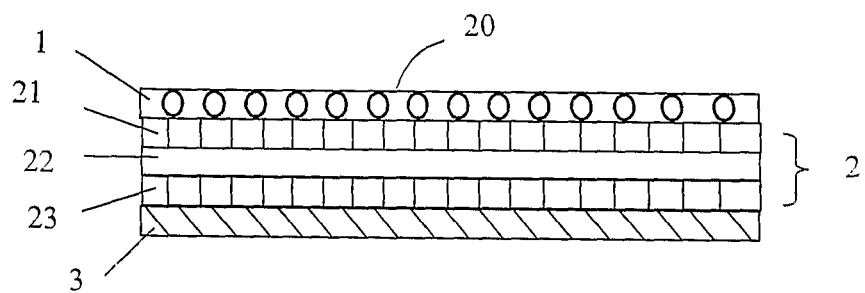
FIG. 2 shows a diagram illustrating a water soluble film based matrix according to another embodiment of this invention.

As shown in FIG. 2, the first layer of a perforated hot/warm water soluble film (1); the core layer (2), formed by entrapping the said absorbents (22) in between two cold water soluble films (21) and (23); and a third layer of a hot/warm water soluble film (3) are laminated to form a water soluble film matrix (20).

The said core layer as formed by entrapping said absorbents in between a cold water soluble film and warm/hot water soluble film will have the cold water soluble film side adjacent to the perforated film side of the matrix; so that when the extracted sample seeps through the perforated hot/warm water soluble film, the cold water soluble film will dissolve and the sample will be absorbed by the entrapped absorbents of the core layer.

Figure 3:
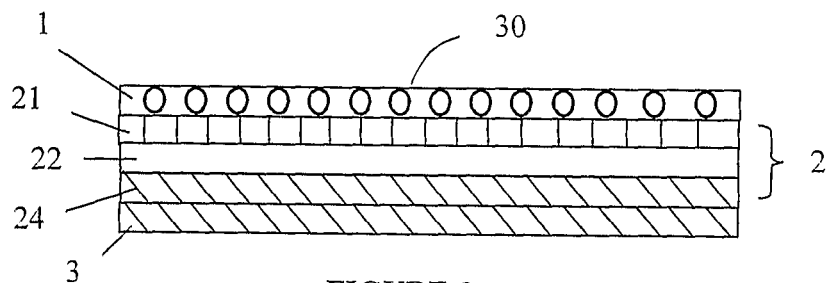
FIG. 3 shows a diagram illustrating a water soluble film based matrix according to yet another embodiment of this invention.

As shown in FIG. 3, the first layer of a perforated hot/warm water soluble film (1); the core layer (2), formed by entrapping the said absorbents (22) in between a cold water soluble films (21) and a hot/warm water soluble film (24); and a third layer of a hot/warm water soluble film (3) are laminated to form a water soluble film matrix (30).

Preferably, as per an embodiment, if a combination of cold water soluble film and hot/warm water soluble film is used for entrapping said absorbents to form a core layer, the third layer of a hot/warm water soluble film, to restrain the leakage, will not be required, as the hot/warm water soluble film of the core layer will act as a protective layer.

Figure 4:
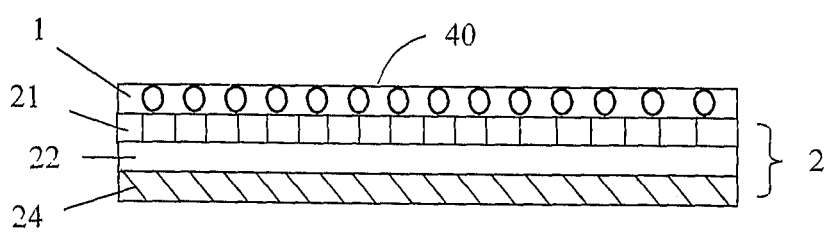
FIG. 4 shows a diagram illustrating a water soluble film based matrix according to yet another embodiment of this invention.

As shown in FIG. 4, the first layer of a perforated hot/warm water soluble film (1); and the core layer (2), formed by entrapping the said absorbents (22) in between a cold water soluble films (21) and a hot/warm water soluble film (24) are laminated to form a water soluble film matrix (40).

Optionally, the said water soluble film based matrix is prepared by directly entrapping the water soluble or dispersible absorbent material in between the first layer of a perforated hot/warm water soluble film and the third layer of a hot/warm water soluble film.

Preferably, a sheet of a water soluble or water dispersible cellulosic or fibrous material is formed or such a pre formed sheet can be used as a core layer and the first layer of perforated hot/warm water soluble film, the core layer of the sheet formed of a water soluble or water dispersible cellulosic or fibrous material and the third layer of hot/warm water soluble film can be laminated together by using either a water soluble adhesive or by heat lamination process.

The thickness of said core layer (2) ranges from 25 microns to 500 microns, preferably from 50 microns to 250 microns, more preferably from 75 to 100 microns.

The said matrix in the form of a roll or a sheet is further adapted to be slit into ribbons, tapes, perforated sheets, perforated tapes, perforated ribbons or cut sheets/strips of desired size or cut portions of any shape and size for further using them for collecting and storing pre determined quantities of extracted samples.

The sample to be collected and stored is dropped on the perforated surface by means of a dropper or any other carrier. As soon as the sample falls on the film, it will seep through the perforates and get absorbed by the core layer. This water soluble film matrix containing the sample can optionally be packed in an outer pack such as a zip-lock bag. This enables safe transportation of sample. This matrix strip containing pre-determined quantity of extracted sample then can be dissolved in an appropriate solvent for further diagnosis and inspection.

The whole matrix containing virus, bacteria, new molecules, genes, DNA, etc can be transported from one place to another e.g. to a laboratory, without the fear of cross infection.

Also, since the whole sample will dissolve in the solution used during testing, there will be no disposal problems as observed in the conventional methods of sample storing.

In the lab the whole strip (matrix) is placed in a beaker containing specified solvent like but not limited to water, and the resultant liquid is then mixed for virus or bacteria detection or used for experiments to find antidotes or medicines to neutralize or kill the bacteria or virus.

The whole strip/matrix containing the gathered sample may be inserted into a PCR reader slot or a portable reader for instant results.

In case if some residues of the matrix are left after its dissolution in water, the water can be heated to higher temperature i.e. about 90° C., so as to completely dissolve the matrix which can then be drained off in the sewage.

As per another embodiment, the invention provides a water soluble film based matrix containing a pre-determined quantity of reactive reagents, which may find an instantaneous result, like it happens in pH paper or as it happens in case of readers that read sugar contents of a diabetic patient, from a blood containing strip.

The reactive agents are incorporated into the core layer itself.

Optionally, the reactive agents can be added into the hot/warm water soluble film layers also.

The said reactive reagents incorporated are selected from ethanol, magnesium chloride, copper sulphate, sodium bicarbonate, sodium carbonate, potassium oxalate, sodium tungstate, sulhhuric acid, diacetyl monoxime, fehling solution, benedicts qualitative reagents various buffers and primers generally used for the reactions and the like. However, these reagents are by no means limiting.

E.g. Pre-determined quantities of reactive reagents, which give the values of sugar contents in blood or urine can be incorporated in the core layer of the matrix. A specified amount of blood or urine or saliva can be dropped onto the strip, which allows the donor's blood, saliva or urine to react with the reagent when it flows through the perforates and comes in contact with the core layer which contains the reagents. The said matrix containing the extracted sample can then be dissolved in hot/warm water so as to observe the colour change and hence analyze the sample.

Optionally, the said matrix containing the extracted sample can be inserted into an external instrument like a portable PCB based unit or a specific reader like sugar content reader in case of a diabetic suspect. Alternatively, the sample containing matrix can be read more precisely and in details in a PCR reader.

The said matrix can be provided with testing kits also so that a person can check the sugar level or any other such diagnosis instantaneously.

This invention shall control the possibility of cross infection and allow possibility of mass collection of samples as well as in certain cases allow instant reading of diseases to segregate the infected living species from non-infected.

The product as shown in the invention can also be used for primary data as well as secondary proof of the results.

The invention will now be described with the help of following examples, which illustrate the preferred mode of practicing this invention. The information contained in the examples is only illustrative in nature and is in no way to be construed to limit various aspects of the invention.

Example 1

A preformed hot water soluble film of 25 microns, as available from Arrow Coated Products Ltd., was perforated by die punching method.

The perforated hot water soluble film layer along with a preformed cellulosic sheet of thickness 50 microns and a preformed hot water soluble film of thickness 20 microns where laminated together by the hot lamination process to form a matrix.

The said matrix was then cut into strips of size 30 mm*30 mm.

One such strip was taken and 2 ml of urine sample was dropped on top of the perforated layer with the help of a pippete. The said urine sample seeped through the perforations and was absorbed by the cellulosic sheet. The said sample was then placed in a zip-lock bag and transported to a laboratory, wherein the sample was dissolved in hot water and further diagnosis was carried out.

In this way there was no leakage during transportation and hence no cross contamination. Also, there was no problem of disposal of the used container as the whole matrix was dissolved in hot water.

Example 2

The matrix as formed in example 1, was cut into strips of size 50 mm*6 mm

One such strip was used to collect a drop of blood pricked with the help of a needle is in a testing kit. The drop of blood seeped through the perforations and was absorbed by the cellulosic sheet. Said strip containing the blood sample was then inserted into a reader for reading the blood sugar level. After, the analysis, the strip was dissolved in hot water and the used water was than drained into the sewage.

We claim:

1. A water soluble film matrix, comprising:
   a. a first layer of a perforated hot or warm water soluble film;
   b. a second layer forming a core layer, the core layer including a water soluble film material combined with a water soluble or water dispersible absorbent material incorporated in or applied to the water soluble film material; and
   c. a third layer of a hot or warm water soluble film;
   wherein the perforated first layer allows a liquid sample to pass through and contact the core layer and the absorbent material of the core layer is chosen to collect and retain the liquid sample within the film matrix.

2. The water soluble film matrix according to claim 1, wherein the hot or warm water soluble film of the first layer, third layer, or first and third layers is formed of edible raw materials selected from the group consisting of polyethylene glycol, glycerin, propylene glycol, polyvinylpyrrolidone, a proteinaceous binder including gelatin, modified gelatins, sodium alginate, or combinations thereof, a polysaccharide including starch, gum Arabic, pullulan and dextrin, tragacanth gum, guar gum, acacia gum, or combinations thereof, polyacrylic acid, methylmethacrylate copolymer, carboxyvinyl polymer, amylose, sweeteners, pectin, chitin, chitosan, levan, elsinan, collagen, zein, gluten, soy protein isolate, casein, shellac, water-soluble cellulose derivatives, and combinations thereof.

3. The water soluble film matrix according to claim 1, wherein the hot or warm water soluble film of the first layer, third layer, or first and third layers is formed of inedible raw materials selected from the group consisting of poly vinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, polymethacrylic acid, polyurethane, and combinations thereof.

4. The water soluble film matrix according to claim 1, wherein the first layer, third layer, or first and third layers comprises a hot water soluble film formed of hydrolyzed polyvinyl alcohol having a degree of hydrolysis ranging from 91% to 99.9%.

5. The water soluble film matrix according to claim 1, wherein the first layer, third layer, or first and third layers comprises a hot water soluble film which dissolves in water having temperature above 60° C.

6. The water soluble film matrix according to claim 1, wherein the first layer, third layer, or first and third layers comprises a warm water soluble film formed by using a combination of fully hydrolyzed and partially hydrolyzed polyvinyl alcohols.

7. The water soluble film matrix according to claim 1, wherein the first layer, third layer, or first and third layers comprises a warm, water soluble film which dissolves in water having temperature ranging from 39° C. to 60° C.

8. The water soluble film matrix according to claim 1, wherein the hot or warm water soluble film of the first layer, third layer, or first and third layers has a thickness in a range from 5 microns to 100 microns.

9. The water soluble film, matrix according to claim 1, wherein the first layer is perforated by a method selected from die cutting, laser cutting, and mechanical perforation.

10. The water soluble film matrix according to claim 1, wherein the absorbent material of the core layer is formed of materials selected from the group consisting of a water soluble or dispersible super absorbent, a sheet of a cellulosic material, absorbent fibres, and combinations thereof.

11. The water soluble film matrix according to claim 1, wherein the core layer has a thickness in a range from 25 microns to 500 microns.

12. The water soluble film matrix according to claim 1, wherein a pre-determined quantity of reactive reagents is incorporated into the core layer to provide an instantaneous result or to provide results by dissolving the matrix containing reactive reagents in water, without any other addition of reagents.

13. The water soluble film matrix according to claim 12, wherein the reactive reagents-are selected from the group consisting of ethanol, magnesium chloride, copper sulphate, sodium bicarbonate, sodium carbonate, potassium oxalate, sodium tungstate, sulphuric acid, diacetyl monoxime, fehling solution, benedicts qualitative reagents, a buffer, a primer, and combinations thereof.

14. The water soluble film matrix according to claim 1, wherein the matrix is adapted for use in collecting and storing pre-determined quantities of extracted samples, and wherein the matrix is in the form of:
   a roll or a sheet which is further adapted to be slit into ribbons, tapes, perforated sheets, perforated tapes or perforated ribbons;
   cut sheets or strips of a desired size; or
   cut portions of any desired shape or size.

15. The water soluble film matrix according to claim 1, wherein the first layer, second layer, and third layer are laminated together using a water soluble adhesive or by hot lamination process.

16. The water soluble film matrix according to claim 1, wherein the core layer is formed by spraying the absorbent material on a semi dried water soluble film.

17. The water soluble film matrix according to claim 1, wherein the core layer is formed by incorporating the absorbent material into a water soluble film material.

18. The water soluble film matrix according to claim 1, wherein the core layer is formed by entrapping the absorbent material in between two cold water soluble films or a combination of a cold water soluble film and hot or warm water soluble film.

19. The water soluble film matrix according to claim 1, wherein the water soluble or water dispersible absorbent material is entrapped, between the first layer and the third layer.

20. A water soluble film matrix, comprising:
   a. a first layer of a perforated hot or warm water soluble film; and
   b. a second layer that is the core layer, the core layer including a combination of water soluble film material and absorbent material, wherein the absorbent material is entrapped between the water soluble film material, the water soluble film material comprising two cold water soluble films or a cold water soluble film and a hot or warm water soluble film;
   wherein the perforated first layer allows a liquid sample to pass through and contact the core layer and the absorbent material of the core layer is chosen to collect and retain the liquid sample within the film matrix.

21. The water soluble film matrix according to claim 20, wherein the cold water soluble film is formed of edible raw materials, inedible raw materials, or combinations thereof.

22. The water soluble film matrix according to claim 20, wherein the cold water soluble film dissolves in water having a temperature ranging from 5° C. to 39° C.

23. The water soluble film matrix according to claim 20, wherein the matrix is adapted for use in collecting and storing predetermined quantities of extracted samples, and wherein the matrix is in the form of:
   a roll or a sheet which is further adapted to be slit into ribbons, tapes, perforated sheets, perforated tapes or perforated ribbons;
   cut sheets or strips of a desired size; or
   cut portions of any desired shape or size.

24. The water-soluble film matrix according to claim 20, wherein the perforated hot or warm water soluble film and the core layer are laminated together using a water soluble adhesive or by a hot lamination process.

25. A test kit for collecting a liquid sample for diagnosis, the test kit comprising a water soluble film matrix, said matrix comprising a plurality of layers including a core layer disposed between two further layers, each further layer comprising a water soluble film layer, wherein at least one of said water soluble film layers is perforated for passage of a liquid sample to contact the core layer, and the core layer comprises absorbent material such that a liquid sample placed in contact with the perforated water soluble film layer can pass through the perforations to be collected and retained within the film matrix by the core layer.

26. The water soluble film matrix of claim 1 wherein said first layer is an outer layer of said water soluble film matrix.

* * * * *